April 28, 1970     F. H. BOND     3,508,292

GROMMETS

Filed Feb. 2, 1968     2 Sheets-Sheet 1

INVENTOR
F. H. Bond.
BY
ATTORNEYS

April 28, 1970   F. H. BOND   3,508,292
GROMMETS

Filed Feb. 2, 1968   2 Sheets-Sheet 2

INVENTOR
Frederick Henry Bond.
BY
ATTORNEYS

United States Patent Office 3,508,292
Patented Apr. 28, 1970

3,508,292
GROMMETS
Frederick Henry Bond, Birmingham, England, assignor to Joseph Lucas (Industries) Limited, Birmingham, England, a British company
Filed Feb. 2, 1968, Ser. No. 702,606
Claims priority, application Great Britain, Feb. 20, 1967, 7,935/67
Int. Cl. B65d 55/00
U.S. Cl. 16—2
2 Claims

ABSTRACT OF THE DISCLOSURE

A grommet for producing a low pressure gas tight seal between a wiring harness and a bulkhead of a road vehicle through which the harness extends includes a resilient member which is adapted to receive the wiring harness and to form a low pressure gas tight seal therewith. The resilient member is shaped to close the hole in the bulkhead through which the wiring harness passes and a pressure plate is engageable with the bulkhead to secure the grommet to the bulkhead and to urge the resilient member into sealing engagement with the bulkhead. The pressure plate includes a plurality of resilient barbed latch members which in use extend through the resilient member and the bulkhead and are snapped into engagement with the bulkhead.

This invention relates to grommets, particularly intended for producing a low pressure gas tight seal between a wiring harness and a bulkhead of a road vehicle through which the harness extends, and of the kind comprising a resilient member adapted to receive the wiring harness and form a seal therewith, the member being shaped to close the hole in the bulkhead through which the wiring harness passes and a pressure plate engageable with the bulkhead to secure the grommet to the bulkhead and to urge the resilient member into sealing engagement with the bulkhead.

According to the invention in a grommet of the kind specified the pressure plate includes a plurality of resilient barbed latch members which in use extend through the resilient member and the bulkhead and are snapped into engagement with the bulkhead.

One example of the invention is illustrated in the accompanying drawings wherein.

Figure 1:
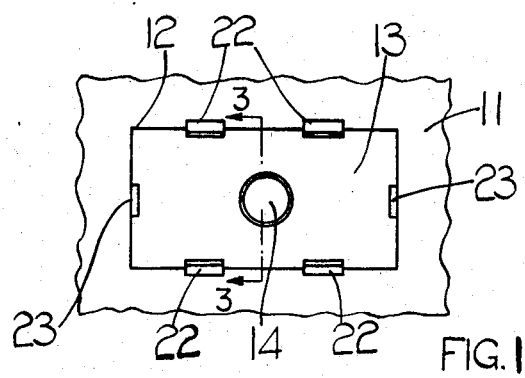
FIGURE 1 is a plan view of a grommet secured to a sheet metal bulkhead.
Figures 3, 4:
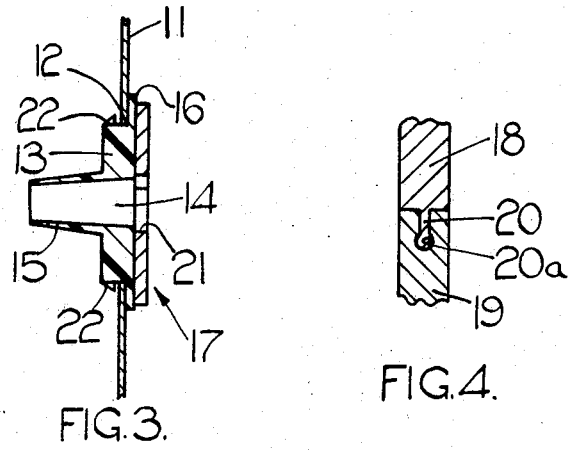
FIGURE 3 is a sectional view on the line 3—3 in FIGURE 1, and, FIGURE 4 is a fragmentary sectional view on the line 4—4 in FIGURE 2.
Figure 2:
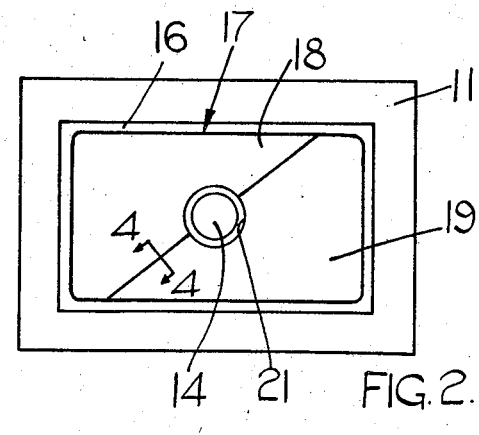
FIGURE 2 is an inverted plan view of the grommet and bulkhead shown in FIGURE 1.
Figure 5:
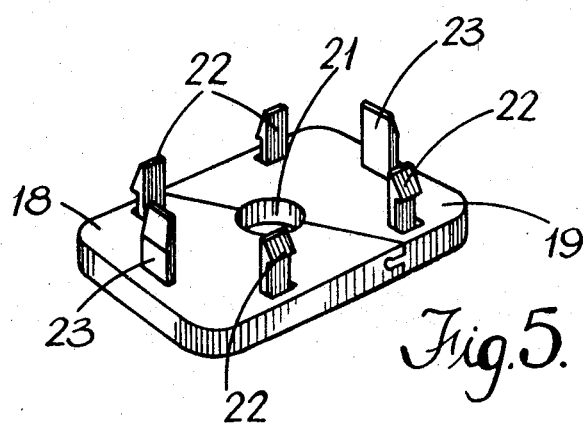
FIGURE 5 is a perspective view showing the manner of interengagement of the parts.

Referring to the drawings, a sheet metal bulkhead 11 of a road vehicle between the engine compartment and the passenger compartment of the vehicle is formed with a rectangular hole 12 through which a wiring harness (not shown) of the vehicle extends. The harness is inserted through a central hole 14 in a rectangular rubber member 13, which constitutes part of a grommet during manufacture of the harness. The wall of the hole 14 is extended on one side of the member 13 to define a resilient neck 15 having a diameter less than the diameter of the harness. Thus the neck 15 is deformed and grips the harness, a low pressure gas tight seal being formed between the harness and member 13.

The member 13 is of the same dimensions as the hole 12 in the bulkhead 11 and its face remote from the neck 15 is formed with an outwardly extending peripheral flange 16. In use the member 13 is engaged with the bulkhead 11 by inserting the member into the hole 12 until the flange 16 engages the bulkhead. By virtue of its resilience the member 13 can be deformed to enable the member 13 to be pushed through the hole 12 in the bulkhead when the harness is fitted in the vehicle, and then pulled back to engage the flange 16 with the bulkhead 11.

The grommet further includes a pressure plate 17. The plate 17 is in two interengageable parts 18, 19 the parts 18, 19 having corresponding tongues 20 and grooves 20a so shaped as to resist separation of the parts 18, 19 in use. When the two parts are engaged they define a rectangular plate having a central hole 21 through which the harness passes.

Each of the parts 18, 19 is provided on its rear surface with a pair of upstanding resilient barbed latch members 22 and an upstanding guide 23. In order to secure the member 13 to the bulkhead 11 the parts 18, 19 are interengaged, with the harness extending through the hole 21. The members 22 and the guides 23 are then pushed through corresponding slots in the flange 16 of the member 13 and the members 22 pass through the hole 12 and snap into engagement with the face of the bulkhead 11 remote from the flange 16, the guides 23 and the members 22 serving to locate the plate 17 accurately with respect to the hole 12 during this operation. The arrangement is such that when the plate 17 is snapped into engagement with the bulkhead 11 the flange 16 will be compressed so that a low pressure gas tight seal is produced between the bulkhead 11 and the member 13. Thus the grommet serves to prevent the passage of engine fumes into the passenger compartment while allowing the wiring harness to extend through the bulkhead 12. It will be appreciated that since the neck 15 is resilient small movements of the harness relative to the bulkhead will not break the seal.

The hole 12 in the bulkhead 11 need not be rectangular in which case the member 13 and the plate 17 are of corresponding shape to the hole 11. Moreover since the pressure plate is in two parts 18, 19 it can be engaged with the harness and the member 13 as described, after the member 13 and the harness are positioned in the vehicle, whereas if the pressure plate were made as a single part it would have to be engaged with the harness during manufacture of the harness and owing to the necessary rigidity of the plate, difficulty would be experienced where it is required to insert the member 13 and the harness through the hole 12 in the bulkhead 11. Furthermore the arrangement described above is particularly advantageous where the bulkhead in question is of the double skinned type, that is to say it is formed from a pair of plates which are spaced apart, since it would be extremely difficult to insert a single part plate through such a bulkhead.

Having thus described my invention what I claim as new and desire to secure by Letters Patent is:

1. A grommet, particularly intended for producing a gas tight seal between a wiring harness and a bulkhead of a road vehicle to which the harness extends, said grommet comprising a resilient member adapted to grip the wiring harness and form a seal therewith, said member being shaped to close the hole in the bulkhead through which the wiring harness passes, and a pressure plate engageable with the bulkhead to secure the grommet to the bulkhead and to urge the resilient member into sealing engagement with the bulkhead, said pressure plate including a plurality of resilient barbed latch members which in use extend through the resilient member and the bulkhead and are snapped into engagement with the bulkhead, and said pressure plate being formed in two parts which are interengageable around said harness prior to engagement of the plate with the bulkhead.

2. A grommet as claimed in claim 1 wherein the two parts of the pressure plate are formed with a tongue and a mating groove respectively, the tongue and the groove being shaped to resist separation of the parts.

References Cited

UNITED STATES PATENTS

| | | | |
|---|---|---|---|
| 973,568 | 10/1910 | Russell | 16—2 |
| 2,309,741 | 2/1943 | Woodward | 16—2 |
| 2,690,470 | 9/1954 | Moorehead | 16—2 |
| 3,182,119 | 5/1965 | Millard | 16—2 XR |
| 3,182,120 | 5/1965 | Duhn | 16—2 XR |

BOBBY R. GAY, Primary Examiner

D. L. TROUTMAN, Assistant Examiner